United States Patent
Schweid

(10) Patent No.: US 9,643,408 B1
(45) Date of Patent: May 9, 2017

(54) JOINT QUANTIZATION OF DROP PROBABILITY FUNCTIONS IN MULTI-SIZE DROP INKJET PRINTERS

(71) Applicant: Xerox Corporation, Norwalk, CT (US)

(72) Inventor: Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/019,399

(22) Filed: Feb. 9, 2016

(51) Int. Cl.
  *B41J 2/045* (2006.01)
  *B41J 2/21* (2006.01)
  *B41J 2/52* (2006.01)
  *B41J 2/36* (2006.01)
  *B41J 2/525* (2006.01)

(52) U.S. Cl.
  CPC ....... *B41J 2/04535* (2013.01); *B41J 2/04586* (2013.01); *B41J 2/2121* (2013.01); *B41J 2/04593* (2013.01); *B41J 2/36* (2013.01); *B41J 2/52* (2013.01); *B41J 2/525* (2013.01)

(58) Field of Classification Search
  None
  See application file for complete search history.

(56) References Cited

U.S. PATENT DOCUMENTS

| | | | |
|---|---|---|---|
| 5,553,162 A | 9/1996 | Gaborski et al. | |
| 5,857,033 A * | 1/1999 | Kim | G06T 5/009 382/168 |
| 6,563,957 B1 * | 5/2003 | Li | H04N 1/4052 358/3.03 |
| 7,128,382 B2 | 10/2006 | Velde | |
| 8,240,798 B2 | 8/2012 | Oshima et al. | |
| 8,654,402 B2 | 2/2014 | Mestha et al. | |
| 9,208,417 B2 | 12/2015 | Kikuta | |
| 9,210,292 B2 | 12/2015 | Miyake et al. | |
| 2001/0050785 A1 | 12/2001 | Yamazaki | |
| 2007/0008350 A1 | 1/2007 | Walmsley | |
| 2008/0303852 A1 | 12/2008 | Serra et al. | |
| 2009/0315930 A1 | 12/2009 | De Meutter | |
| 2012/0242756 A1 | 9/2012 | Nystrom et al. | |
| 2013/0176600 A1 | 7/2013 | Chandu et al. | |

(Continued)

OTHER PUBLICATIONS

Li, E. Q. et al., "Piezoelectric Drop-on-Demand Inkjet Printing of Rat Fibroblast Cells: Survivability Study and Pattern Printing," http://arxiv.org/abs/1310.0656?context=physics.bio-ph (2013) 17 pages.

(Continued)

*Primary Examiner* — Lisa M Solomon
(74) *Attorney, Agent, or Firm* — Kermit D. Lopez; Luis M. Ortiz; Ortiz & Lopez, PLLC

(57) ABSTRACT

Methods and systems for sequentially quantizing probability density functions for inkjet printing. In an example embodiment, an operation can be implemented to quantize probability density functions associated with larger drops among a plurality of drops provided by an inkjet printer. Non-quantized probability functions associated with remaining ink drops are then modified utilizing an error incurred at each quantization during quantization of the probability density functions associated with the larger drops. Quantizing the probability density functions and modifying the non-quantized probability functions continue until all drop size probability functions associated with the plurality of drops are quantized.

20 Claims, 4 Drawing Sheets

(56) References Cited

U.S. PATENT DOCUMENTS

2013/0188204 A1   7/2013  Ortiz Segovia et al.
2013/0278662 A1  10/2013  Ashida
2014/0355043 A1  12/2014  Zeng et al.
2015/0177671 A1   6/2015  Yoshida et al.
2015/0341526 A1  11/2015  Ashworth et al.

OTHER PUBLICATIONS

Ostromoukhov, V. et al., "Multi-Level Colour Halftoning Algorithms," Intl. Symposium on Advanced Imaging and Network Technologies Oct. 1996, SPIE vol. 2949, pp. 332-340, Berlin.

Levien, R., "Practical Issues in Color Inkjet Halftoning," Proc. SPIE 5008, Color Imaging VIII: Processing, Hardcopy, and Applications Jan. 13, 2003, 5 pages.

Richmond, M., "Physics of an Ink-Jet Printer," http://spiff.rit.edu/classes/phys213/lectures/inkjet/inkjet_long.html, Mar. 1, 1999, 8 pages.

* cited by examiner

JOINT QUANTIZATION OF DROP PROBABILITY FUNCTIONS IN MULTI-SIZE DROP INKJET PRINTERS

TECHNICAL FIELD

Embodiments are generally related to inkjet printers and components such as inkjet print heads. Embodiments also relate to multi-level inkjet printers in which a group of nozzle jets drops liquid ink and particles of the ink (e.g., ink dots) are formed on a print medium to render pre-determined characters, text, and images.

BACKGROUND

Inkjet printers can accomplish low-cost and high-quality color printed material easily. As such, such printers are widely used not only in offices, but also by general users due to the increasing popularity of personal computers and imaging devices such as digital cameras. For example, the increased use of digital cameras has largely driven the market for inkjet photo printers.

Generally, in an inkjet printer, a moving part referred to as a carriage, for example, integrally comprising ink cartridges and print heads moves back and forth on a print medium in a direction crossing a direction to convey the medium, and nozzles of the print head jet (eject) liquid ink drops to form minute ink dots on the print medium. In this manner, pre-determined characters or images can be rendered on the print medium to create desired printed material. A typical carriage includes ink cartridges for four colors including black (and yellow, magenta, cyan) and a print head for each of the colors, so that not only monochrome print, but also full color print in combination of the respective colors can be easily performed (further, print in six colors including the colors light cyan and light magenta, seven colors, and eight colors are practically implemented).

A particular type of inkjet printer is a multi-level inkjet printer that uses a multi-level inkjet head wherein its individual jets have the ability to fire a plurality of drop sizes. For example, such inkjets may emit a small, medium, or large drop (or no drop at all). Some multi-level inkjet heads perform halftoning utilizing a set of probability density functions, similar to TRCs (Tone Reproduction Curves), which control the probability that a drop of a certain size is jetting from a given jet; there is a separate probability density function for each possible drop size of the jets. Due to implementation constraints those probability density functions are quantized to a certain bit depth, similar to the quantization of TRCs. Since there are several probability density functions used in the halftoner quantization errors accrue quickly and degrade performance more quickly than bi-level systems that only have one controlling function (e.g., a TRC).

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved inkjet printing methods and systems.

It is another aspect of the disclosed embodiments to provide for a method and system of quantizing a set of probability density functions jointly instead of separately and applying the probability density functions for use in multi-size drop inkjet printing.

The aforementioned aspects and other objectives and advantages can now be achieved as described herein. Methods and systems are disclosed for sequentially quantizing probability density functions for inkjet printing. In an example embodiment, an operation can be implemented to quantize probability density functions associated with larger drops among a plurality of drops provided by an inkjet printer. Non-quantized probability functions associated with remaining ink drops are then modified utilizing an error incurred at each quantization during quantization of the probability density functions associated with the larger drops. Quantizing the probability density functions and modifying the non-quantized probability functions continue until all drop size probability functions associated with the plurality of drops are quantized.

A set of probability density functions can thus be jointly (instead of separately) quantized for inkjet printers capable of printing multi-level size dots. Such an approach utilizes a sequential method of quantization, wherein the probability density functions associated with the largest drops are quantized first. An error diffusion type algorithm can be utilized to modify the non-quantized probability density functions of the remaining drop sizes using the errors incurred at each quantization step. The process continues until all drop size probability density functions are quantized.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
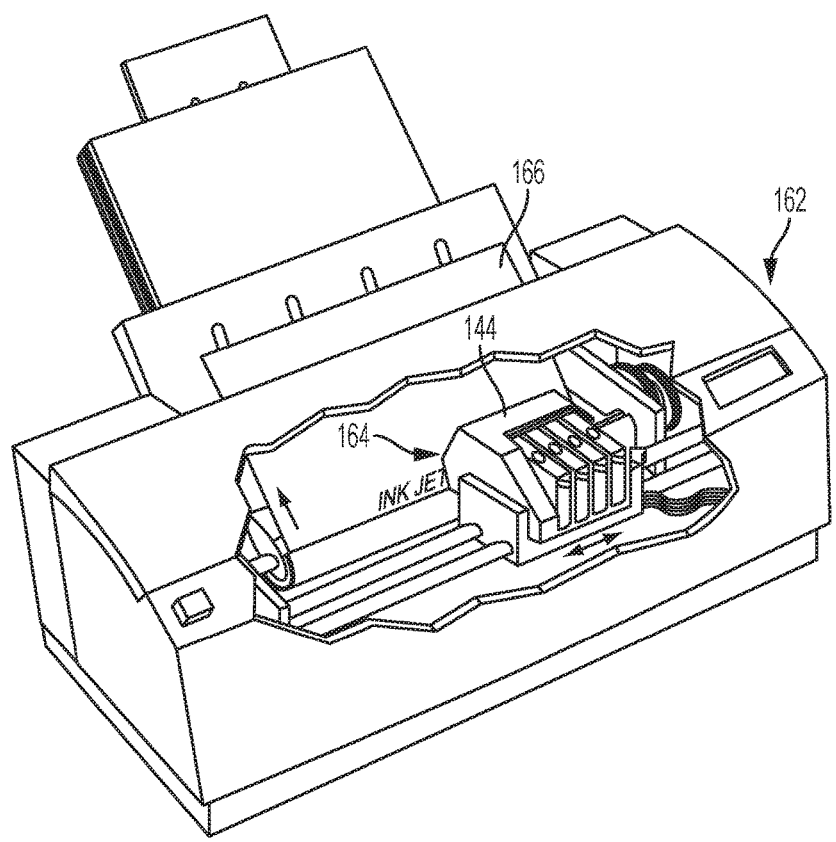
FIG. 1 illustrates a printing device including a print head, which can be adapted for use in accordance with an example embodiment.

FIG. 1 illustrates a printer 162 including one or more print heads 144, which can be adapted for use in accordance with an example embodiment. In the example shown in FIG. 1, the printer 162 can be implemented as a multi-level inkjet printer and the print heads 144 can constitute multi-level print heads wherein ink 164 is ejected from one or more nozzles. Each print head 144 can be adapted to operate in accordance with digital instructions (which are discussed in greater detail herein) to create a desired image on a print medium 166 such as a paper sheet, plastic, etc. Each print head 144 may move back and forth relative to the print medium 166 in a scanning motion to generate the printed image swath by swath. Alternately, the print head 144 may be held fixed and the print medium 166 moved relative to it, creating an image as wide as the print head 144 in a single pass. Additionally, printing can include using the print head 144 to form an ink pattern 164 on an intermediate heated structure (not individually depicted for simplicity) such as a drum, and using the drum to transfer (i.e., transfix) the image onto the print medium 166.

The print head 144 can be narrower than, or as wide as, the print medium 166. The inkjet print head(s) 144 can be configured with the ability to fire a plurality of ink drop ("drop") sizes. For example, jets could have the ability to emit either a small, medium, or large drop (or no drop at all).

In an example embodiment, in order to leverage standard on/off halftoning techniques, the halftone process can be composed of two halves. The first half utilizes standard screening methods to determine a subset of pixels to jet. The second half, a post processing method, can determine which size drop is jetted for each of the jets that are members of that subset. In one implementation the second stage may be implemented stochastically; with a given probability distribution for each input gray level a small, medium, or large drop is chosen.

As with all halftoning methods (e.g., screening), the probability density function can be quantized. In the case of halftoning, the quantization is driven by the smaller of the number of bits and the screen size.

In the case of multi drop sizes of the second step, the probability distribution method is quantized by the number of bits of each entry in a set of probability density functions. In one convenient implementation, the number of bits chosen for the probability density functions is set equal to the bit depth of the halftoner input. The error introduced by the quantization of the set of probability function exacerbates the errors introduced by the halftoning due to bit depth of the input and the screen size.

The set of probability density functions for drop size can be composed of M distinct probability density functions, one for each of the M possible drop sizes possible for a jet. The physical limitations of the system require that the drop events are mutually exclusive—only one drop output is possible for any given drop jetting. For example, consider equation (1) below:

$$P(\text{dropsize}J, \text{dropsize}K | \text{drop}) = 0 \text{ if } J \neq K \quad (1)$$

As an example, consider the case of jets that can emit small, medium, and large drop sizes. In this application, there would be three conditional probability density functions: $p_{small}$(gray level|drop), $p_{medium}$(gray level|drop), and $p_{large}$(gray level|drop).

The three probability functions are normalized such that:

$$p_{small}(\text{gray level}|\text{drop}) + p_{medium}(\text{gray level}|\text{drop}) + p_{large}(\text{gray level}|\text{drop}) = 1 \quad (2a)$$

or to generalize to the case of M drop sizes:

$$\Sigma_{i=1:M} p_i(\text{gray level}|\text{drop}) = 1 \quad (2b)$$

In practice, for ease of implementation, the M conditional probability functions are derived from the M probability density functions.

$$p_i(\text{gray level}|\text{drop}) = p_i(\text{gray level}) / \Sigma_{i=1:M} p_i(\text{gray level}) \quad (3)$$

where $p_i$(gray level) is the probability of a drop of a given size (dropsize(i)) and the sum of all probability functions is the probability of any size drop being printed. It is these probability functions for each drop size that are quantized in the implementation of the algorithm that determines drop size for those jets that are activated.

The halftoner can produce a number of active locations equal to the sum of the drop probability functions and the second state creates the desired distribution among those drops that are activated. It can be shown in such a paradigm that:

$$\text{Total mass}(\text{gray level}) = \Sigma_{i=1:M} \text{dropsize}(i) * p_i(\text{gray level}) \quad (4)$$

In other words, the total mass size is the sum of the probabilities of each drop times the mass of the drop. For hardware implementations, the probability density functions can be stored as integers utilizing a fixed normalization constant. For many systems the normalization constant, N, can be expressed as shown in equation (5) below where B is the bit resolution of the system:

$$N=2^B-1 \quad (5)$$

The conversion of the probability functions for all the drop sizes is converted to an integer representation by multiplying the probability by the conversion factor of equation (5). These numbers must then be modified into pure integer values. When this conversion is completed, the resulting mass placed down can be represented as shown in equation (6) below with $\epsilon \sim U(-½N, ½N)$:

$$\text{Total mass actual(gray level)} = \Sigma_{i=1:M}\text{dropsize}(i)^* (p_i(\text{gray level})+\epsilon_i) \quad (6)$$

The variable $e_i$ is what is needed to represent the probability function in the fix bit integer domain, resulting in a mass error of:

$$\text{Total mass error(gray level)} = \Sigma_{i=1:M}\text{dropsize}(i)^*\epsilon_i \quad (7)$$

If each of the M probability density functions are rounded independently to the nearest integer, the total mass error will have a distribution that is approximately Gaussian of:

$$\text{Total mass error} \sim N(0, \Sigma_{i=1:M} \text{dropsize}(i)^2/(12^*N^2)) \quad (8)$$

It is possible to minimize this error, however, if the error introduced in one stage is transmitted to the error in another stage. For example, the probability of a large drop is decreased slightly due to rounding, this can be partially accounted for by increasing the probability of a medium drop. The algorithm used is similar to error diffusion used in halftoning. In standard error diffusion, the errors accumulated are distributed to neighboring pixels. That heuristic, however, can be modified in the context of one or more embodiments to have the errors accumulated in quantizing a probability function of a given drop size distributed to other drop size probability density functions.

First, the largest drop size probability density function, $p_1$(gray level), is quantized using standard rounding:

$$\tilde{p}_1(\text{gray level}) = \lfloor p_1(\text{gray level})^*N+0.5 \rfloor / N \quad (9)$$

where $\tilde{p}_1$(gray level) is the quantized version of the probability density function, $p_1$(gray level). The mass error generated by rounding just $p_1$(gray level) is then calculated using:

$$\text{Total mass error}_1(\text{gray level}) = (p_1(\text{gray level}) - \tilde{p}_1(\text{gray level}))^*\text{dropsize}(1) \quad (10)$$

This error can then be utilized to modify the drop size probability density function, $p_2$(gray level), which is associated with the next largest drop size. The new modified version, $\hat{p}_2$(gray level), will remove the mass error introduced (in equation (10)) by the quantization of the first stage. This modifying equation of $p_2$(gray level) to $\hat{p}_2$(gray level):

$$\hat{p}_2(\text{gray level}) := p_2(\text{gray level}) + \text{Total mass error}_1(\text{gray level})/\text{dropsize}(2) \quad (11)$$

The second modified probability density function, $\hat{p}_2$(gray level), can then be quantized by the formulation shown in equation (12) below:

$$\tilde{p}_2(\text{gray level}) = \lfloor \hat{p}_2(\text{gray level})^*N+0.5 \rfloor / N \quad (12)$$

Similar to before, the total mass error is calculated, this time using the difference between the modified probability density function and the quantized one:

$$\text{Total mass error}_2(\text{gray level}) = (\hat{p}_2(\text{gray level}) - \tilde{p}_2(\text{gray level}))^*\text{dropsize}(2) \quad (13)$$

The process continues to subsequent drop probability density functions, in decreasing drop size order, until all M probability density functions are quantized.

Because this algorithm modifies the probability density functions using an error term (as in equation (11)), it is possible to generate a result that is not valid probability, such as a negative result or a result such that the sum of the probabilities of all drop sizes is greater than 1. To eliminate this possibility, equation (12) can be modified to limit the result to a valid output using:

$$\tilde{p}_2(\text{gray level}) = \max(0, \min(1-\tilde{p}_1(\text{gray level}), \lfloor \hat{p}_2(\text{gray level})^*N+0.5 \rfloor / N)) \quad (12a)$$

This ensures that all quantized probability density functions of the set are all positive and their sum is less than or equal to one (so that the probability of placing down a drop is not greater than 1). Clearly, if there is no min/max clipping in equation (12a)—that is the results of (12) and (12a) are identical—then the total mass error will be:

$$\text{Total mass error} \sim U(-\text{dropsize}(M)/2N, \text{dropsize}(M)/2N) \quad (13)$$

This is the quantization error associated with the smallest drop size. This error has a variance of [dropsize(M)$^2$/ (12$^*$N$^2$)]—much smaller than that of the independently quantized probability density function result of equation (8). For example, if there are three-drop sizes of 4, 8, and 12 picoliters, the standard deviation of the error is reduced by about 75% using this joint optimization method as compared to standard rounding. Even in cases where clipping does occur in equation (12a), the resultant mass error introduced by quantizing is never larger in this joint optimization method than in standard rounding.

Figure 2:
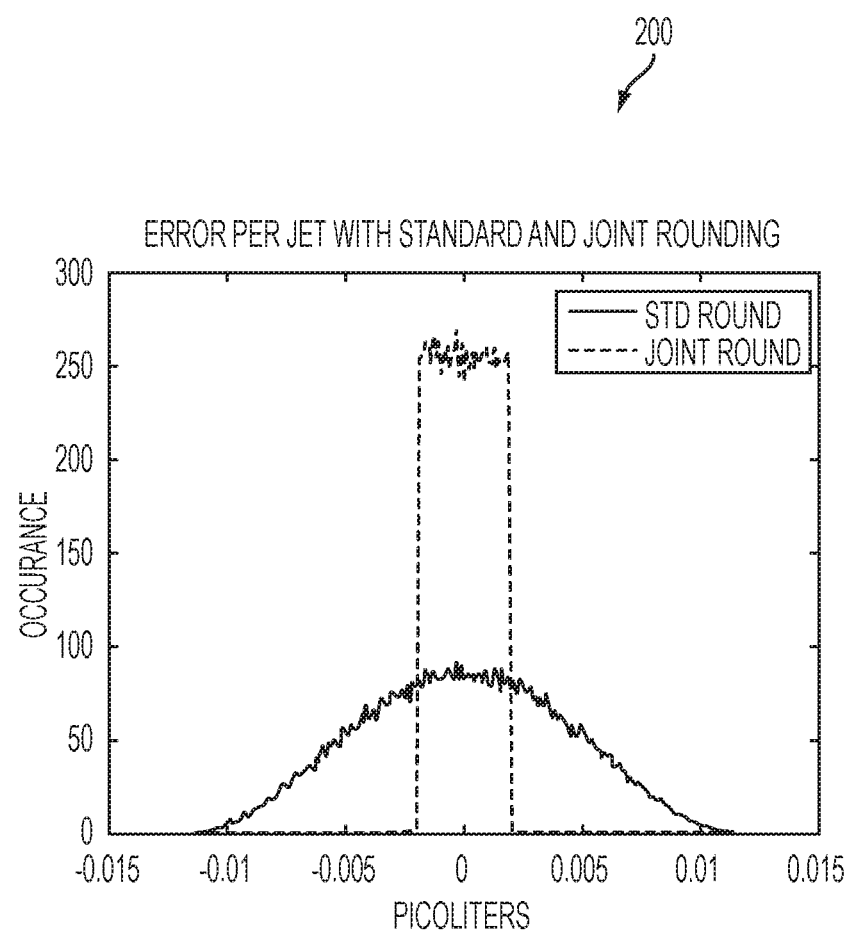
FIG. 2 illustrates a sample graph comparing errors introduced in a 3-drop size system using both standard rounding and joint (error diffused) rounding, in accordance with an example embodiment.

FIG. 2 illustrates a sample graph 200 comparing errors introduced in a 3-drop size system using both standard rounding and joint (error diffused) rounding, in accordance with an example embodiment. An example algorithm can be defined in pseudo code as follows:

```
Total_mass_error=0;total_commanded_coverage=0;

for i=1:M p(i)_modified=p(i)+Total_mass_error/dropsize(i);

p(i)_round=max(0,min(1-total_commanded_coverage,floor(p(i)_modified*N+0.5)/N));

Total_mass_error=(p(i)_modified-p(i)round)*dropsize(i);

total_commanded_coverage+=p(i)_round;

end
``` where p(i) is $p_i$(gray level), p(i)_modified is $\hat{p}_i$(gray level) and p(i)_round is $\tilde{p}_i$(gray level). Note that all equations are vector equations with a length equal to the number of gray levels.

The example algorithm has the following novel properties:

1) Probability density functions of drops as a function of gray level are sequentially determined.
2) The errors introduced in quantization are converted to mass errors.
3) Those mass errors are propagated to the next smallest drop probability density function and normalized using the new next smallest drop size.

4) Limits are placed to ensure all modified and rounded probability density functions are valid and their sum is limited to 1.

Figure 3:
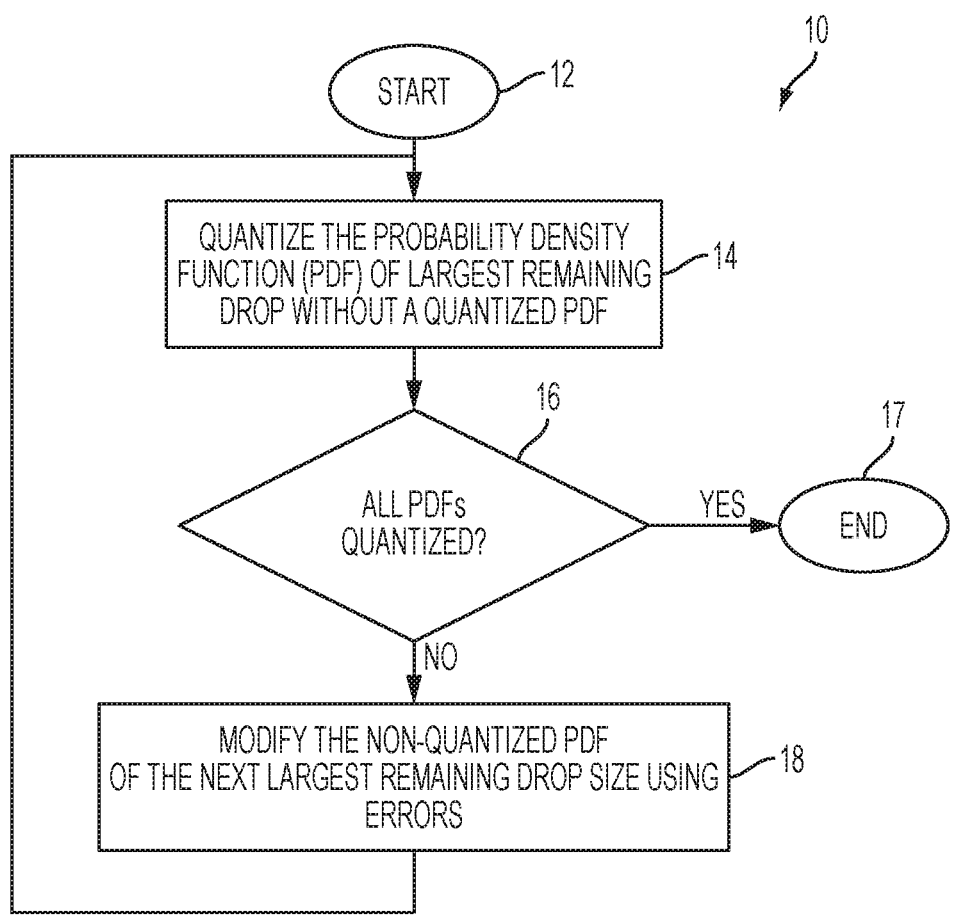
FIG. 3 illustrates a flow chart of operations depicting logical operational steps of a method for joint quantization of drop probability functions in a multi-size drop inkjet printer, in accordance with an example embodiment.

FIG. 3 illustrates a flow chart of operations depicting logical operational steps of a method 10 for joint quantization of drop probability functions in a multi-size drop inkjet printer, in accordance with an example embodiment. As shown at block 12, the process can be initiated. As indicated at block 14, a step or operation can be implemented for quantizing the PDF (Probability Density Function) of the largest remaining drop without a quantized PDF. Then, as depicted at decision block 16, a test can be performed to determine if all PDF's are quantized. If so, then the process ends, as depicted at block 17. If not, then as illustrated at block 18, a step or operation can be implemented to modify the non-quantized PDF of the next largest remaining drop size using errors. FIG. 3 thus illustrates a joint quantization process. Note that in the case of non-joint (e.g., standard) quantization, a step of modifying non-quantized PDF's using the errors is not used. Additionally, anytime errors of one stage drop size the PDF of another drop size, this involves joint quantization, since each one is not quantized alone.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 4:
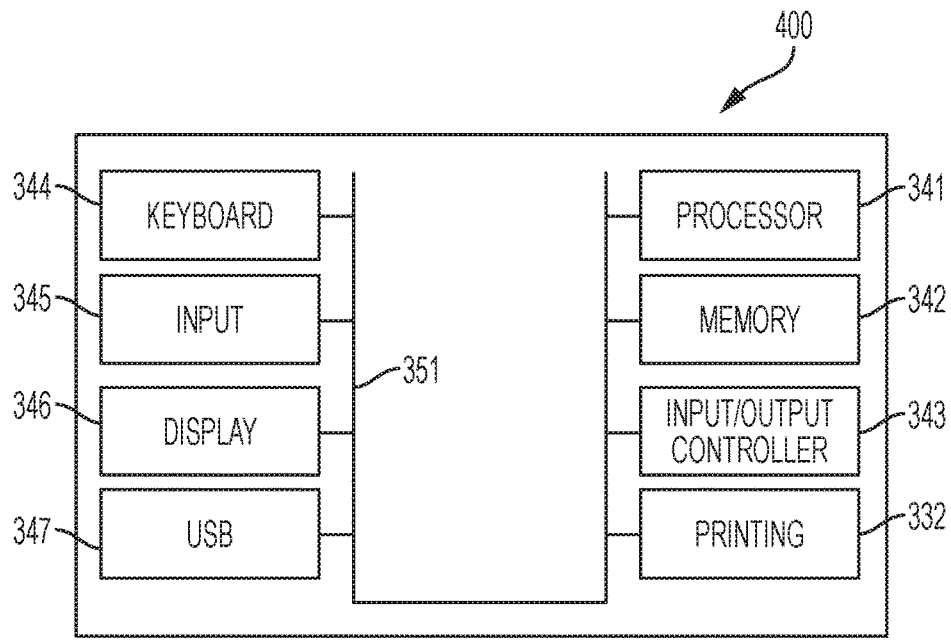
FIG. 4 illustrates a schematic view of a computer system, in accordance with an example embodiment.
Figure 5:
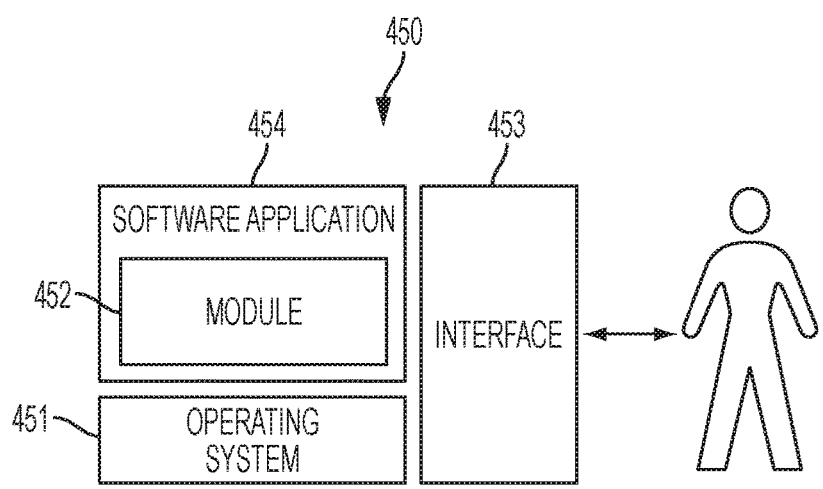
FIG. 5 illustrates a schematic view of a software system including a module, an operating system, and a user interface, in accordance with an example embodiment.

FIGS. 4-5 are shown only as exemplary diagrams of data-processing environments in which embodiments may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, some embodiments may be implemented in the context of a data-processing system 400 which may be, for example, a client-computing device (e.g., a client PC, laptop, tablet computing device, etc.) that communicates with peripheral devices (not shown) via a client-server network (e.g., wireless and/or wired). In other embodiments, data-processing system 400 may function as a server in the context of such a client-server network.

The example data-processing system 400 shown in FIG. 4 can include a system bus 351 and one or more processors such as processor 341 (e.g., a CPU or Central Processing Unit), a memory 342 (e.g., random access memory and/or other types of memory components), a controller 343 (e.g., an input/output controller), a peripheral USB (Universal Serial Bus) connection 347, a keyboard 344 (e.g., a physical keyboard or a touchscreen graphically displayed keyboard), an input component 345 (e.g., a pointing device, such as a mouse, track ball, pen device, which may be utilized in association with the keyboard 344, etc.), a display 346, and in some cases, a printer component 332 (e.g., an inkjet printer) which may communicate electronically with a printer such as, for example, the inkjet printer 162 depicted in FIG. 1.

As illustrated, the various components of data-processing system 400 can communicate electronically through the system bus 351 or similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a stand-alone desktop computer, a laptop computer, a Smartphone, a pad computing device, a server, and so on.

FIG. 5 illustrates a computer software system 450 for directing the operation of the data-processing system 400 shown in FIG. 4. Software application 454, stored for example in memory 342, generally includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454.

The interface 453, in some embodiments, can serve to display results, whereupon a user may supply additional inputs or terminate a session.

The software application 454 can include one or more modules such as module 452, which can, for example, implement instructions or operations such as those described herein. Examples of instructions that can be implemented by module 452 include steps or operations such as those shown and described herein with respect to the operations or blocks shown in FIG. 3 and elsewhere herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application. However, a module may also be composed of, for example, electronic and/or computer hardware or such hardware in combination with software. In some cases, a "module" can also constitute a database and/or electronic hardware and software that interact with the database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. A module can also be composed of other modules or sub-modules. Thus, the instructions or steps such as those shown in FIG. 3 and discussed elsewhere herein can be implemented in the context of such a module, modules, sub-modules, and so on.

FIGS. 4-5 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

It can also be appreciated that the various steps, methods, and algorithms disclosed herein can be implemented in the context of an off-line algorithm for calculating quantization functions. The algorithm or calculations themselves do not take place in a printer such as, for example, the printer shown in FIG. 1; rather, they can be utilized to generate look-up tables that are loaded in the printer. In other words, in such an example embodiment, the activity of doing the calculations may take place through internal operations and no member of the public (e.g., a consumer/user) would be aware of the underlying calculations. In another example embodiment, however, the disclosed approach can be implemented in the context of a computer-implemented tool by which a customer can generate his or her own look-up tables. Such a tool may include, for public use, the algorithm for calculating quantization functions.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for sequentially quantizing probability density functions for inkjet printing, said method comprising:
   quantizing probability density functions associated with larger drops among a plurality of drops provided by an inkjet print head;
   modifying non-quantized probability functions associated with remaining drops among said plurality of drops utilizing errors incurred at each quantization during said sequentially quantizing said probability density functions associated with said larger drops among said plurality of drops; and
   continue quantizing said probability density functions and modifying said non-quantized probability functions until all drop size probability functions associated with said plurality of drops are quantized.

2. The method of claim 1 further comprising determining said probability functions as a function of gray level in response to said quantizing said probability density functions and said modifying said non-quantized probability functions.

3. The method of claim 1 further comprising converting said errors incurred at each quantization to mass errors.

4. The method of claim 3 further comprising:
   propagating said mass errors to a probability density function of a next smallest drop; and
   normalizing said mass errors utilizing a new next smallest drop size.

5. The method of claim 1 further comprising designating a limit that ensures that all modified and rounded probability density functions are valid and their sum is limited to a value of 1.

6. The method of claim 1 wherein said inkjet print head comprises a multi-level inkjet print head.

7. The method of claim 1 wherein said non-quantized probability functions are modified utilizing error diffusion.

8. A system for sequentially quantizing probability density functions for inkjet printing, said system comprising:
   at least one processor;
   a computer-usable medium embodying computer program code, said computer-usable medium capable of communicating with said at least one processor, said computer program code comprising instructions executable by said at least one processor and configured for:
      quantizing probability density functions associated with larger drops among a plurality of drops provided by an inkjet print head;

modifying non-quantized probability functions associated with remaining drops among said plurality of drops utilizing errors incurred at each quantization during said sequentially quantizing said probability density functions associated with said larger drops among said plurality of drops; and continue quantizing said probability density functions and modifying said non-quantized probability functions until all drop size probability functions associated with said plurality of drops are quantized.

9. The system of claim 8 wherein said instructions are further configured for determining said probability functions as a function of gray level in response to said quantizing said probability density functions and said modifying said non-quantized probability functions.

10. The system of claim 8 wherein said instructions are further configured for converting said errors incurred at each quantization to mass errors.

11. The system of claim 10 wherein said instructions are further configured for:

propagating said mass errors to a probability density function of a next smallest drop; and normalizing said mass errors utilizing a new next smallest drop size.

12. The system of claim 8 wherein said instructions are further configured for designating a limit that ensures that all modified and rounded probability density functions are valid and their sum is limited to a value of 1.

13. The system of claim 8 wherein said inkjet print head comprises a multi-level inkjet print head.

14. The system of claim 8 wherein said non-quantized probability functions are modified utilizing error diffusion.

15. A system for sequentially quantizing probability density functions for inkjet printing, said system comprising:

an inkjet printer having an inkjet print head;

wherein probability density functions associated with larger drops among a plurality of drops provided by said inkjet print head are quantized;

wherein non-quantized probability functions associated with remaining drops among said plurality of drops are modified utilizing errors incurred at each quantization during said sequentially quantizing said probability density functions associated with said larger drops among said plurality of drops; and wherein said probability density functions are subject to continuous quantizing and said non-quantized probability functions are subject to continuous modifications until all drop size probability functions associated with said plurality of drops are quantized.

16. The system of claim 15 wherein said probability functions are determined as a function of gray level in response to said quantizing said probability density functions and said modifying said non-quantized probability functions.

17. The system of claim 15 wherein said errors incurred at each quantization are converted to mass errors.

18. The system of claim 17 wherein mass errors are propagated to a probability density function of a next smallest drop and said mass errors are normalized utilizing a new next smallest drop size.

19. The system of claim 15 wherein said inkjet print head comprises a multi-level inkjet print head.

20. The system of claim 15 wherein said non-quantized probability functions are modified utilizing error diffusion.

\* \* \* \* \*